United States Patent
Matsuoka et al.

(10) Patent No.: US 8,411,531 B2
(45) Date of Patent: Apr. 2, 2013

(54) MODULATION DEVICE, DEMODULATION DEVICE, AND ACOUSTIC SIGNAL TRANSMISSION METHOD

(75) Inventors: Hosei Matsuoka, Yokosuka (JP); Takeshi Yoshimura, Yokohama (JP); Toshirou Kawahara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 516 days.

(21) Appl. No.: 12/663,075

(22) PCT Filed: Jun. 3, 2008

(86) PCT No.: PCT/JP2008/060207
§ 371 (c)(1), (2), (4) Date: Mar. 11, 2010

(87) PCT Pub. No.: WO2008/149856
PCT Pub. Date: Dec. 11, 2008

(65) Prior Publication Data
US 2010/0182876 A1    Jul. 22, 2010

(30) Foreign Application Priority Data
Jun. 7, 2007 (JP) ................ P2007-151897

(51) Int. Cl.
*H04B 1/707* (2011.01)
*H04B 11/00* (2006.01)

(52) U.S. Cl. .......... 367/134; 367/135; 367/137

(58) Field of Classification Search .......... 367/134, 367/135, 137
See application file for complete search history.

(56) References Cited

U.S. PATENT DOCUMENTS

| | | | |
|---|---|---|---|
| 2004/0090865 A1* | 5/2004 | Davies et al. | 367/134 |
| 2008/0112885 A1* | 5/2008 | Okunev et al. | 424/9.1 |
| 2010/0135122 A1* | 6/2010 | Rhodes et al. | 367/134 |

FOREIGN PATENT DOCUMENTS

| | | |
|---|---|---|
| JP | 7 245574 | 9/1995 |
| JP | 9 233047 | 9/1997 |
| JP | 10 210002 | 8/1998 |
| JP | 2001 148670 | 5/2001 |
| WO | 02 45286 | 6/2002 |
| WO | 2007 043376 | 4/2007 |

* cited by examiner

*Primary Examiner* — Ian Lobo
(74) *Attorney, Agent, or Firm* — Oblon, Spivak, McClelland, Maier & Neustadt, L.L.P.

(57) ABSTRACT

A modulation device, a demodulation device, and a transmission system and acoustic signal transmission method using them which can carry out a synchronization process for data signals without using a carrier frequency for a synchronization signal. The modulation device transmits an acoustic signal superposed with a PN sequence set according to a carrier frequency and a data signal. A demodulation device receives the acoustic signal, determines the PN sequence having the highest maximum correlation value with the acoustic signal in a plurality of PN sequences, detects a symbol synchronization point according to the correlation value between the thus determined PN sequence and the acoustic signal, and performs a synchronization process. Thereafter, according to the detected synchronization point and determined PN sequence, an OFDM demodulation processing unit decides the carrier frequency band of the data signal superposed on the acoustic signal and demodulates the data signal.

6 Claims, 9 Drawing Sheets

MODULATION DEVICE, DEMODULATION DEVICE, AND ACOUSTIC SIGNAL TRANSMISSION METHOD

TECHNICAL FIELD

The present invention relates to a modulation device, a demodulation device, and an acoustic signal transmission method which transmit data by superposing a data signal onto an acoustic signal.

BACKGROUND ART

For transmission systems for transmitting data signals superposed on acoustic signals, there are a technique in which a transmission signal is diffusively superposed on an acoustic signal as described in Patent Literature 1 and a technique in which data is transmitted by utilizing a certain frequency band of an acoustic signal as described in Patent Literature 2. Such techniques for superposing data signals onto acoustic signals are typically used as digital watermarking for copyright protection and unauthorized copy prevention, and also as information communication techniques for transmitting information from a speaker to a microphone via sound waves.

Patent Literature 1: International Publication WO02/45286 pamphlet

Patent Literature 2: Japanese Patent Application Laid-Open No. 2001-148670

DISCLOSURE OF INVENTION

Technical Problem

When the techniques used in the above-mentioned Patent Literatures capable of superposing data signals onto acoustic signals are employed for transmitting information from a speaker to a microphone, there is a case where a signal for attaining symbol synchronization is necessary at the time of demodulating a transfer signal at a transmission destination. When the carrier frequency of the transfer signal is variable, it is necessary to detect the carrier frequency on the reception side. For example, the sound quality may vary depending on frequencies of acoustic signals, thereby yielding a demand for choosing one frequency from some carrier frequencies existing in acoustic signals on the transmission side (modulation side). This makes it necessary for the reception side (demodulation side) to identify the carrier frequencies.

Utilizing a notification carrier frequency for identifying the frequencies for carrying the data signal, however, is problematic in that the frequency utilization efficiency decreases accordingly. When transmitting information via sound waves in an audible range in particular, the utilizable frequency band is so narrow (e.g., 20 Hz to 20 kHz) that reserving a frequency band for detecting frequencies in the audible range may greatly deteriorate performances of a transmission system.

For solving the problems mentioned above, it is an object of the present invention to provide a modulation device, a demodulation device, and an acoustic signal transmission method which makes it possible to arbitrarily choose a carrier frequency for a data signal and can give notice of the carrier frequency without using a frequency for giving notice of carrier frequencies of the data signal.

Solution to Problem

For solving the above-mentioned problems, the acoustic signal transmission method of the present invention comprises a selection step, in a transmission source, of selecting a carrier frequency of a data signal and a PN sequence corresponding to the carrier frequency; a modulation step, in the transmission source, of modulating the carrier frequency selected by the selection step by using the data signal; a generation step, in the transmission source, of generating a symbol synchronization signal according to the PN sequence selected by the selecting step; a superposition step, in the transmission source, of superposing the symbol synchronization signal generated by the generation step and the data signal modulated by the modulation step onto the acoustic signal and transmitting thus obtained signal; a reception step, in a transmission destination, of receiving the acoustic signal superposed with the modulated data signal; a calculation step, in the transmission destination, of calculating correlations between the acoustic signal received by the reception step and a plurality of PN sequences; a determination step, in the transmission destination, of determining the PN sequence having the highest maximum correlation value with the received acoustic signal in the plurality of PN sequences according to a result of calculation by the calculation step; a synchronization processing step, in the transmission destination, of deciding a synchronization point by using the PN sequence determined by the determination step and performing a symbol synchronization process of the modulated data signal superposed on the acoustic signal according to the synchronization point; and a demodulation step, in the transmission destination, of demodulating the modulated data signal subjected to the synchronization process by the synchronization processing step.

In this aspect of the present invention, according to a carrier frequency band of an acoustic signal, the transmission source selects a PN sequence of a symbol synchronizing signal corresponding to the frequency band and transmits the acoustic signal superposed with the selected PN sequence. The transmission destination receives the transmitted acoustic signal and calculates cross-correlations between the received acoustic signal and a plurality of PN sequences. In the plurality of PN sequences, one having the highest maximum correlation value is determined, and a symbol synchronization point is detected according to the correlation value between the determined PN sequence and the acoustic signal. Thereafter, according to the detected synchronization point and determined PN sequence, the carrier frequency of the data signal superposed on the acoustic signal is decided, so as to demodulate the data signal. As a consequence, even when a carrier frequency of a data signal is arbitrarily decided on the modulation device side, the demodulation device side can identify the carrier frequency and demodulate the data signal according to the carrier frequency. Hence, no frequency is reserved for detecting frequencies in the audible range, whereby the efficiency of frequency utilization can be improved, and the data signal can be superposed on the acoustic signal without lowering the sound quality of the acoustic signal.

The modulation device of the present invention is a modulation device for superposing a data signal on an acoustic signal and transmitting thus obtained signal, the modulation device comprising selection means for selecting a carrier frequency of the data signal and a PN sequence corresponding to the carrier frequency; modulation means for modulating the carrier frequency selected by the selection means by using the data signal; generation means for generating a symbol synchronization signal according to the PN sequence selected by the selection means; and superposition means for superposing the symbol synchronization signal generated by the generation means and the data signal modulated by the modulation means onto the acoustic signal.

In this aspect of the present invention, a carrier frequency of a data signal and a PN sequence corresponding to the carrier frequency are selected, and thus selected carrier frequency is modulated with a data signal. A symbol synchronization signal is generated according to the selected PN series, and thus generated symbol synchronization signal and the modulated data signal are superposed on an acoustic signal. This can give notice of the carrier frequency by using the symbol synchronization signal without reserving a frequency for specifying the carrier frequency. Hence, this makes it possible to change carrier frequencies for a data signal as appropriate, and give notice of the carrier frequency of the data signal without using a carrier frequency for giving notice of the carrier frequency of the data signal.

Preferably, the modulation device of the present invention further comprises insertion means for inserting at a rear part of a data symbol of the modulated data signal a guard time block generated by duplicating a predetermined part in front of the data symbol, while the modulated data signal inserted with the guard time block by the insertion means and the symbol synchronization signal are superposed on the acoustic signal.

In this aspect of the present invention, a guard time block generated by duplicating a predetermined part in front of a data symbol of the modulated data signal is inserted at the rear part of the data symbol. Then, the modulated data signal inserted with the guard time block and the symbol synchronization signal are superposed on the acoustic signal. This can prevent symbols from interfering with each other even when the symbols are out of sync with each other.

The demodulation device of the present invention comprises input means for receiving an acoustic signal superposed with a modulated data signal; calculation means for calculating correlations between the acoustic signal received by the input means and a plurality of PN sequences; determination means for determining the PN sequence having the highest maximum correlation value with the received acoustic signal in the plurality of PN sequences according to a result of calculation by the calculation means; synchronization processing means for deciding a synchronization point by using the PN sequence determined by the determination means and performing a symbol synchronization process of the modulated data signal superposed on the acoustic signal according to the synchronization point; and demodulation means for demodulating the modulated data signal subjected to the synchronization process by the synchronization processing means.

In this aspect of the present invention, the acoustic signal superposed with the modulated data signal is received, correlations between the received acoustic signal and a plurality of PN sequences are calculated, and the PN sequence having the highest maximum correlation value in a plurality of PN sequences is determined according to the result of calculation. Then, a synchronization point is decided by using the determined PN sequence, and a symbol synchronization process of the modulated data signal superposed on the acoustic signal is performed according to the synchronization point, so as to demodulate the modulated data signal subjected to the synchronization process. This makes it possible to identify the carrier frequency for the data signal designated on the modulation device side without using a carrier frequency for giving notice of the carrier frequency for the data signal designated on the modulation device side.

The calculation means in the demodulation device of the present invention may calculate correlations between the received acoustic signal and PN sequences in a thinning-out manner at intervals of at least two samples, while the demodulation device may further comprise shift means for forwardly shifting according to the number of thinned-out samples in the correlation calculation by the calculation means the synchronization point of a data symbol derived from the correlation calculation by the calculation means.

In this aspect of the present invention, correlations between the received acoustic signal and PN sequences are calculated in a thinning-out manner at intervals of at least two samples, and the synchronization point of a data symbol derived from the correlation calculation is shifted forward according to the number of thinned-out samples in the correlation calculation. This can lower the amount of arithmetic operations for the correlation calculation and reduce the interference between symbols even when a synchronization deviation occurs.

Advantageous Effects of Invention

The present invention reserves no frequency for detecting frequencies in the audible range, thereby being able to improve the efficiency of utilization of frequencies, and can superpose data signals onto acoustic signals without lowering the sound quality of acoustic signals.

REFERENCE SIGNS LIST

3 . . . modulation device; 5 . . . speaker; 7 . . . microphone; 9 . . . demodulation device; 20 . . . S/P conversion unit; 21 . . . carrier selection unit; 22 . . . OFDM modulation processing unit; 23 . . . guard time signal generation unit; 24 . . . spectrum envelope amplitude adjustment unit; 25 . . . bandpass filter; 26 . . . PN sequence selection unit; 27 . . . symbol synchronization signal generation unit; 28 . . . D/A conversion unit; 29 . . . adder unit; 31 . . . A/D conversion unit; 32 . . . PN sequence correlation calculation unit; 33 . . . PN sequence selection unit; 34 . . . symbol synchronization processing unit; 35 . . . carrier selection unit; 36 . . . bandpass filter; 37 . . . guard time elimination unit; 38 . . . OFDM demodulation processing unit; 39 . . . P/S conversion unit; 100 . . . acoustic signal transmission system; 200 . . . acoustic signal reception system

DESCRIPTION OF EMBODIMENTS

The present invention will easily be understood in view of the following detailed descriptions with reference to the accompanying drawings illustrated for one embodiment. The embodiment of the present invention will now be explained with reference to the accompanying drawings. When possible, the same parts will be referred to with the same signs while omitting their overlapping explanations.

Figure 1:
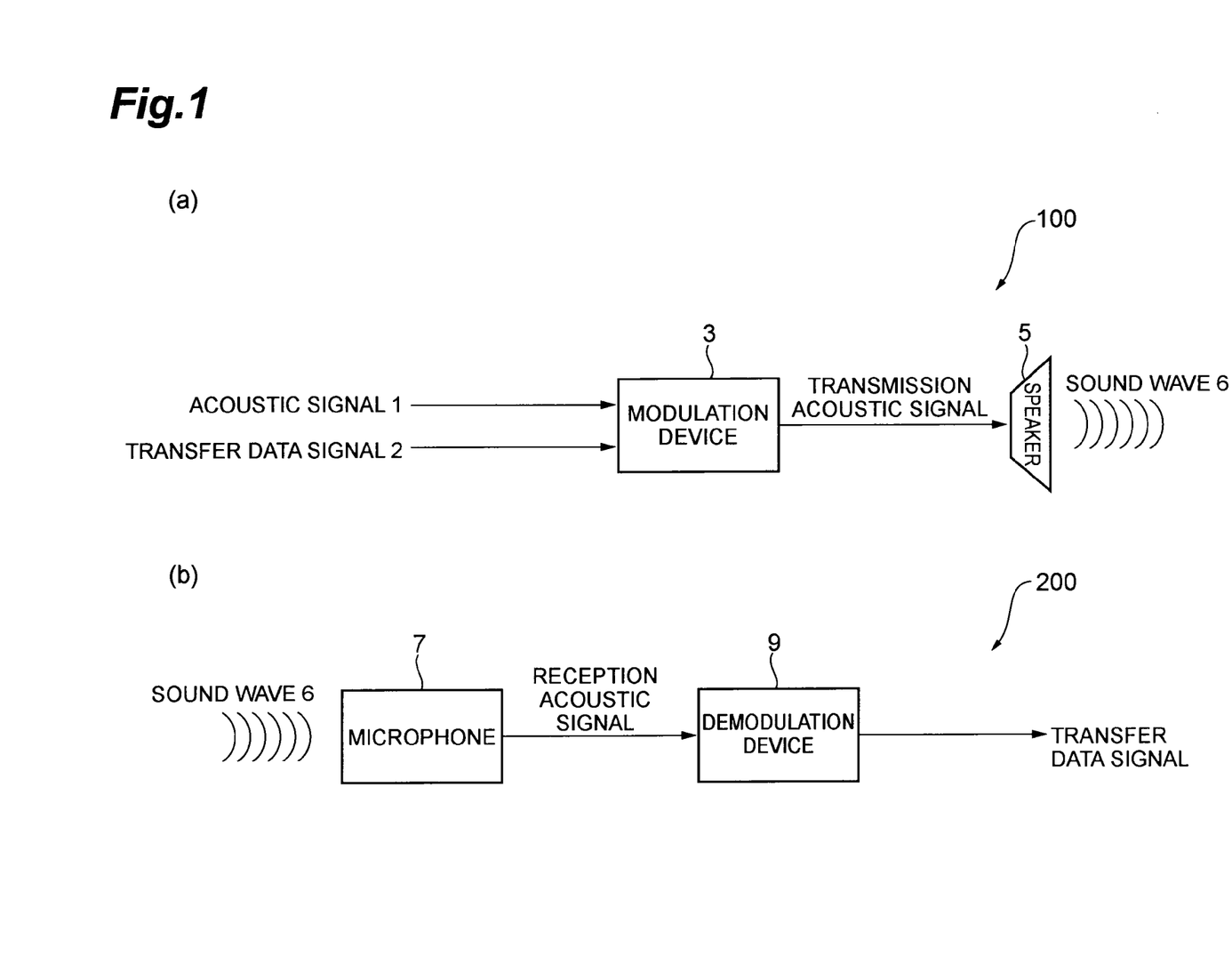
FIG. 1 is a conceptual diagram illustrating a concept of the acoustic signal communication system in accordance with an embodiment.

FIG. 1 illustrates an embodiment in which an OFDM modulated signal in a certain frequency band in the audible range is transmitted, while a symbol synchronization signal of the OFDM modulation is transmitted as being superposed on an acoustic signal in a low range. FIG. 1 is a conceptual diagram illustrating a concept of an acoustic signal communication system of this embodiment in which an acoustic signal subjected to OFDM modulation is outputted from a speaker 5, and thus outputted acoustic signal is inputted through a microphone 7. As illustrated in FIG. 1, the system structure in the acoustic signal communication system of this embodiment is constituted by an acoustic signal transmission system 100 and an acoustic signal reception system 200. As illustrated in FIG. 1(*a*), the acoustic signal transmission system 100 includes a modulation device 3 for modulating a transfer data signal 2, superposing the modulated transfer data signal 2 onto an acoustic signal 1, and converting the resulting signal into a transmission acoustic signal 4, and the speaker 5 for outputting the transmission acoustic signal 4 as a sound wave 6. As illustrated in FIG. 1(*b*), the acoustic signal reception system 200 includes the microphone 7 for receiving the sound wave 6 and generating a reception acoustic signal 8, and a demodulation device 9 for demodulating the reception acoustic signal 8 and extracting the transmission data signal 2. In the following, the modulation device 3 and demodulation device 9 will be explained in detail.

Figure 2:
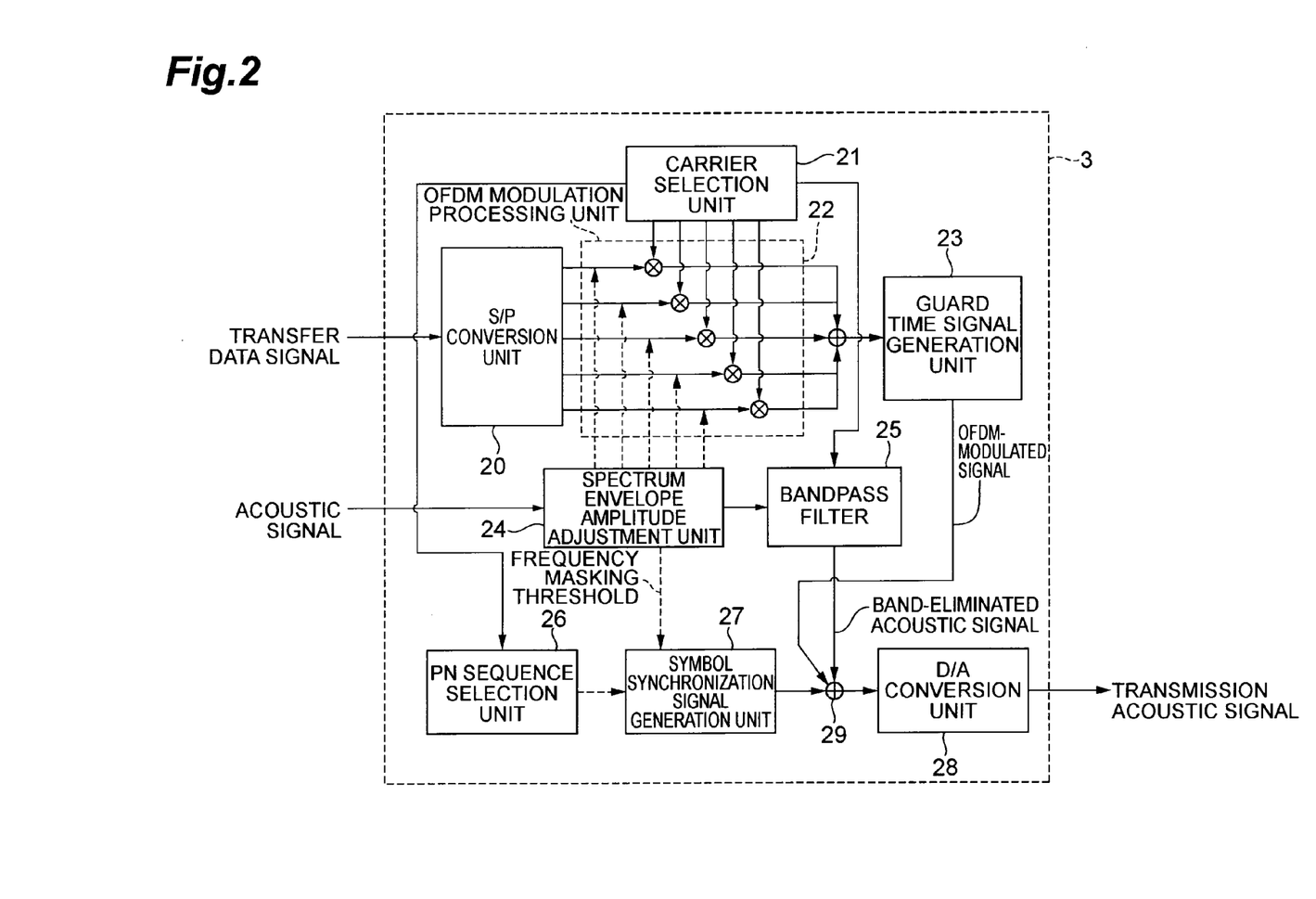
FIG. 2 is a block diagram illustrating the structure of a modulation device 3 in the embodiment.

FIG. 2 is a block diagram illustrating the structure of the modulation device 3 in the embodiment. The modulation device 3 includes an S/P conversion unit 20, a carrier selection unit 21 (selection means), an OFDM modulation processing unit 22 (modulation means), a guard time signal generation unit 23 (insertion means), a spectrum envelope amplitude adjustment unit 24, a bandpass filter 25, a PN sequence selection unit 26 (selection means), a symbol synchronization signal generation unit 27 (generation means), a D/A conversion unit 28, and an adder unit 29 (superposition means). In the following, the individual structures will be explained.

The S/P conversion unit 20 is a part which converts a single-bit-stream transfer data signal into a parallel-bit-stream transfer data signal.

The carrier selection unit 21 is a part which selects a frequency band of the OFDM-modulated signal and provides the OFDM modulation processing unit 22 with the carrier frequency. The carrier selection unit 21 selects one carrier frequency from a plurality of carrier frequencies prepared according to a designation from a user of this system or other designations.

The OFDM modulation processing unit 22 is a part which OFDM-modulates a carrier in the carrier frequency band selected by the carrier selection unit 21 by using the transfer data signal converted by the S/P conversion unit 20. The OFDM modulation processing unit 22 combines the modulated carriers at the respective frequencies, so as to form an OFDM symbol. Then, it outputs thus formed OFDM symbol to the guard time signal generation unit 23.

Here, according to an amplitude adjusting action from the spectrum envelope amplitude adjustment unit 24, the OFDM modulation processing unit 22 generates an OFDM-modulated signal having an amplitude matching the amplitude of the acoustic signal. That is, it adjusts the OFDM-modulated signal so as to make it attain the amplitude matching that of each frequency band whether the amplitude of the frequency band is greater or smaller.

The guard time signal generation unit 23 is a part which duplicates a part of the OFDM symbol that is an OFDM-modulated signal generated in the OFDM modulation processing unit 22 and adds this part in front or rear of the OFDM symbol, so as to generate an OFDM frame. To the adder unit 29, the guard time signal generation unit 23 outputs an OFDM-modulated signal constituted by the OFDM frame having a guard block indicating a guard time added thereto.

Figure 3:
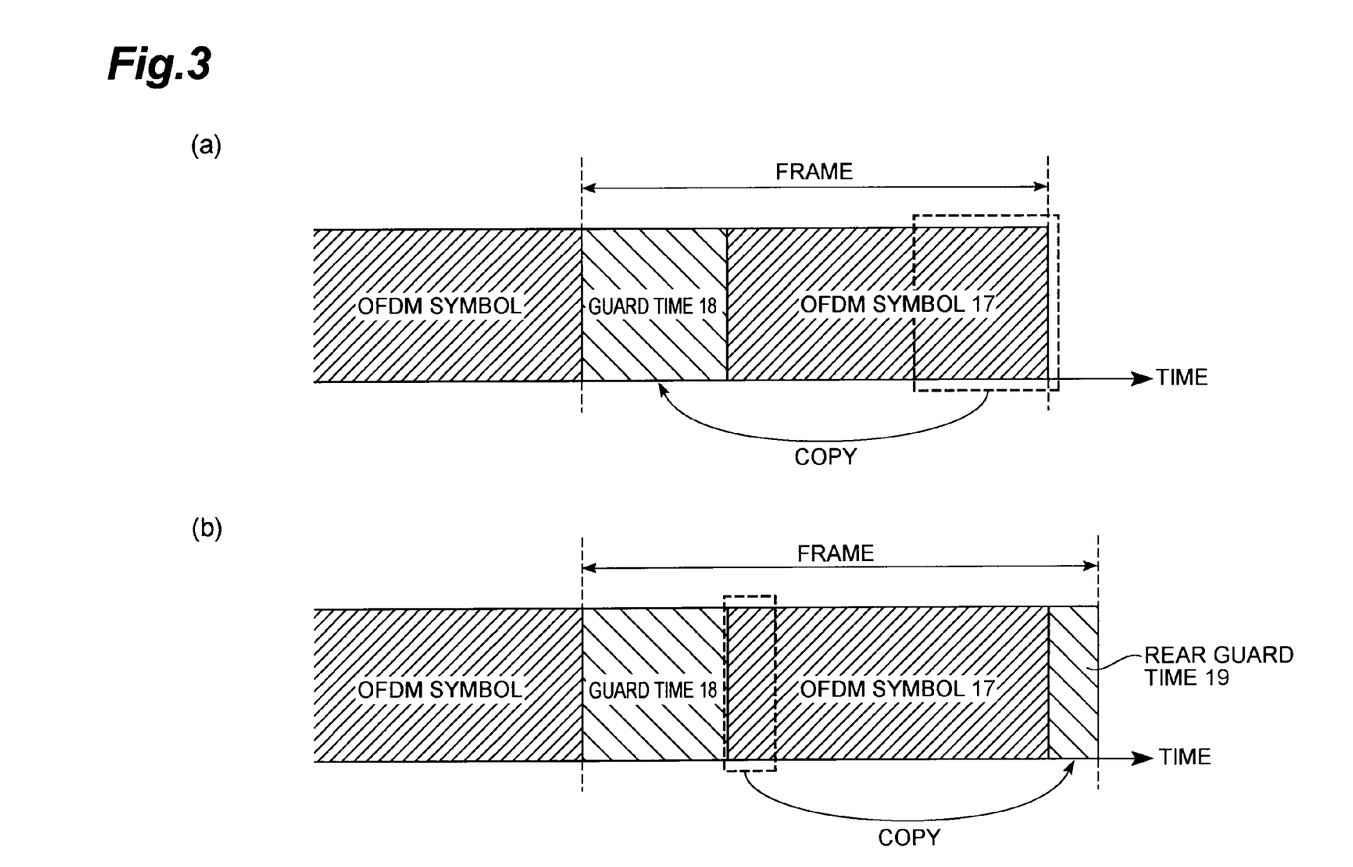
FIG. 3 is a schematic diagram illustrating a process for duplicating a part of an OFDM symbol 17 and generating a guard time.

A specific method of adding the guard time will now be explained with reference to FIG. 3. FIG. 3 is a schematic diagram illustrating a process for duplicating a part of an OFDM symbol 17 and generating a guard time. As illustrated in FIG. 3, an OFDM frame is constituted by an OFDM symbol and guard times arranged in front and rear thereof (or a guard time arranged in front or rear thereof).

As illustrated in FIG. 3(*a*), the guard time signal generation unit 23 inserts a guard time in front of each OFDM symbol 17 in the OFDM-modulated signal, i.e., duplicates a predetermined symbol part in the rear of the OFDM symbol 17 and adds the resulting guard block as a guard time in front of the OFDM symbol 17. As illustrated in FIG. 3(*b*), the guard time signal generation unit 23 may insert a guard time in the rear of each symbol 17 in the OFDM-modulated signal generated by the OFDM modulation processing unit 22, i.e., duplicate a predetermined symbol part in the front of the OFDM symbol 17 and add the resulting guard block as a guard time behind the OFDM symbol 17.

Thus, in order to prevent symbols from interfering with each other even when a symbol synchronization point shifts slightly on the reception side (demodulation device 9), the guard time signal generation unit 23 inserts guard times in front and rear of the symbol as illustrated in FIG. 3. That is, as illustrated in FIG. 3(*a*), a guard time 18 is inserted in front of the OFDM symbol 17. This aims at preventing symbols from interfering with each other even when the previous OFDM symbol arrives late because of multipath interference of reflected waves and the like. However, since an OFDM symbol may interfere with the next one if the symbol synchronization point shifts rearward when the front guard time 18 is used alone, a guard time which can cope with slight deviations in the symbol synchronization point is also inserted on the rear side in this embodiment. No interference between symbols will occur even if the symbol synchronization shifts rearward up to the number of samples indicated by the inserted rear guard time 19.

The spectrum envelope amplitude adjustment unit 24 is a part which calculates a frequency spectrum of the acoustic signal by the Fourier transform and provides the OFDM modulation processing unit 22 with carrier amplitude information according to the frequency spectrum. The spectrum envelope amplitude adjustment unit 24 also calculates a frequency masking threshold and supplies it to the symbol synchronization generation unit 27.

Figure 4:
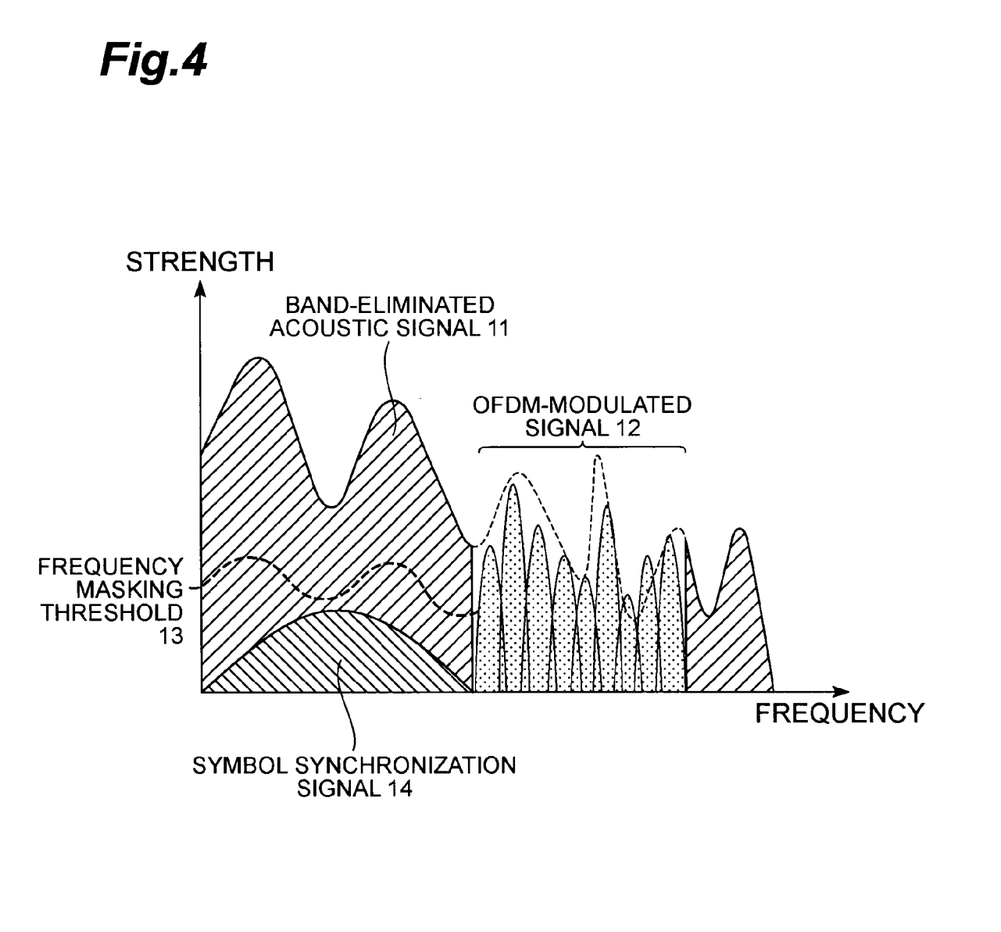
FIG. 4 is a schematic chart illustrating a transmission acoustic signal transmitted from a speaker 5.

The OFDM-modulated signal adjusted by the spectrum envelope adjustment unit 24 will now be explained with reference to FIG. 4. FIG. 4 is a schematic chart illustrating a transmission acoustic signal transmitted from the speaker 5. In conformity to the acoustic signal, the spectrum envelope adjustment unit 24 adjusts the amplitude indicated in the OFDM-modulated signal 12. While the broken line part in FIG. 4 illustrates the amplitude of the acoustic signal, the OFDM-modulated signal 12 is adjusted so as to attain the amplitude matching the part indicated by the broken line.

The bandpass filter 25 is a part which eliminates signals in the OFDM signal frequency band by passing the acoustic signal through a band elimination filter. Specifically, as illustrated in FIG. 4, the bandpass filter 25 generates a band-eliminated acoustic signal 11 in which the acoustic signal is eliminated from the frequency band corresponding to the carrier frequency selected by the carrier selection unit 21 as a part where the OFDM-modulated signal 12 should be synthesized. The band-eliminated acoustic signal 11 is fed from the bandpass filter 25 to the adder unit 29.

Figure 5:
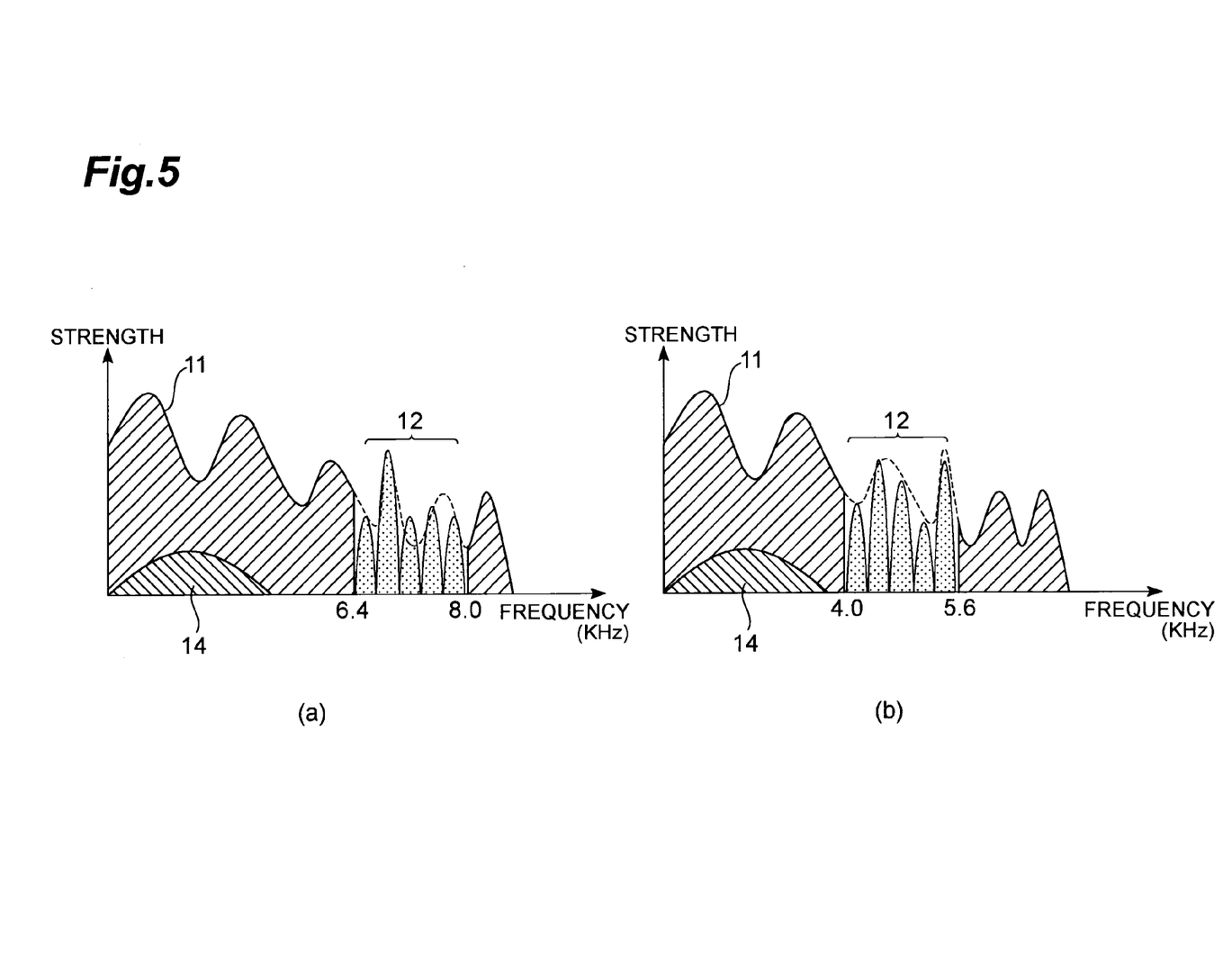
FIG. 5 is a conceptual chart illustrating the relationship between a frequency band and PN sequences.

The PN sequence selection unit 26 is a part which chooses a PN sequence corresponding to the frequency selected by the carrier selection unit 21 and provides the symbol synchronization generation unit 27 with thus chosen PN sequence. FIG. 5 is a conceptual chart illustrating the relationship between a frequency band and PN sequences. When the carrier selection unit 21 selects a frequency band A (where the OFDM frequency ranges from 6.4 to 8.0 kHz) as illustrated in FIG. 5(a), for example, a PN sequence 1 (generator polynomial: $x6+x+1$) is chosen. When the carrier selection unit 21 selects a frequency band B (where the OFDM frequency ranges from 4.0 to 5.6 kHz) as illustrated in FIG. 5(b), for example, a PN sequence 2 (generator polynomial: $x6+x5+x2+x+1$) is selected.

The symbol synchronization generation unit 27 is a part which generates a symbol synchronization signal from the PN sequence selected by the PN sequence selection unit 26 and adjusts its amplitude according to the frequency masking threshold. For example, the symbol synchronization generation unit 27 generates a symbol synchronization signal 14 so as to make it lower than the frequency masking threshold 13 as illustrated in FIG. 4.

The D/A conversion unit 28 is a part which outputs the transmission acoustic signal 4 obtained as an analog signal converted from a signal into which the OFDM-modulated signal, symbol synchronization signal, and band elimination acoustic signal are combined together by the adder unit 29. The transmission acoustic signal 4 is outputted from the speaker 5 as the sound wave 6.

Figure 6:
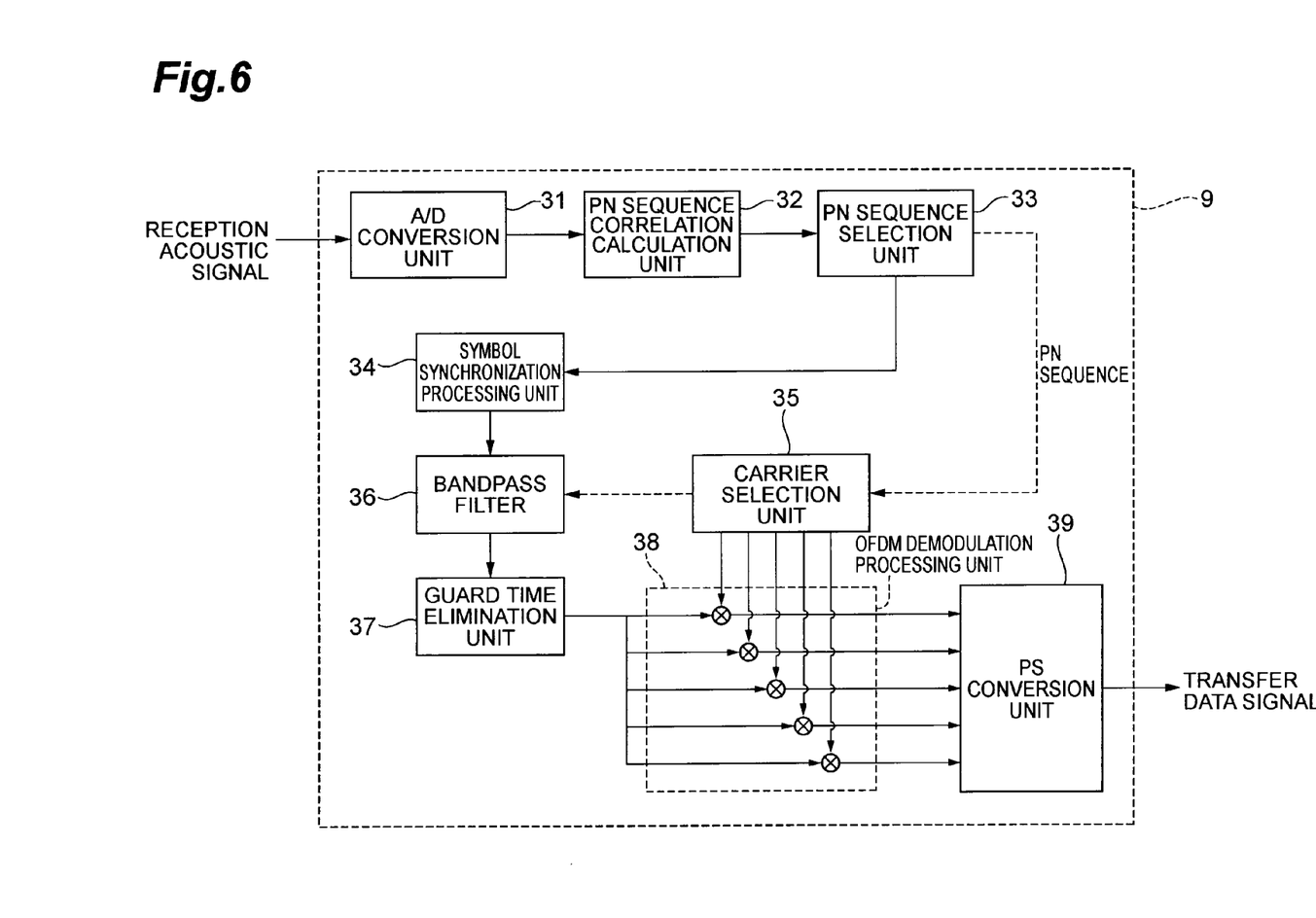
FIG. 6 is a block diagram illustrating the structure of a demodulation device 9 in this embodiment.

The demodulation device 9 provided in the acoustic signal reception system 200 for inputting the sound wave 6 based on the transmission acoustic signal 4 generated by the modulation device 3 will now be explained. FIG. 6 is a block diagram illustrating the structure of the demodulation device 9. The demodulation device 9 includes an A/D conversion unit 31 (input means), a PN sequence correlation calculation unit 32 (calculation means), a PN sequence selection unit 33 (determination means), a symbol synchronization processing unit 34 (synchronization processing means and shift means), a carrier selection unit 35, a bandpass filter 36, a guard time elimination unit 37, an OFDM demodulation processing unit 38 (demodulation means), and a P/S conversion unit 39. In the following, the individual structures will be explained.

The A/D conversion unit 31 is a part which converts the reception acoustic signal 8, which is recorded after being received by the microphone 7, into a digital signal.

The PN sequence correlation calculation unit 32 is a part which calculates respective correlations between the reception acoustic signal and a plurality of PN sequences.

Illustrated here is an example in which correlation calculations are thinned out in the PN sequence correlation calculation unit 32 in order to reduce the amount of calculation for correlations between the reception acoustic signal and PN sequences. In general, while shifting the reception acoustic signal at intervals of one sample, the PN sequence correlation calculation unit 32 calculates correlations with the PN sequences. This requires the calculation process by the code length of each PN sequence×the number of kinds of PN sequences, thereby increasing the amount of calculation. For reducing the amount of calculation, the correlations between the reception acoustic signal and PN sequences may be calculated at intervals of at least two samples.

When the correlation calculation is thinned out at intervals of n samples, a symbol synchronization point may deviate by ±0 to n samples. If the symbol synchronization point shifts forward, the guard time can prevent symbols from interfering with each other to some extent. The symbol synchronization point shifting rearward, on the other hand, will cause interference with the rear OFDM frame.

Though the modulation device 3 is equipped with means for inserting the rear guard time in order to cope with the rear shift, the symbol synchronization processing unit 34 may be provided with shift means for forwardly shifting the symbol synchronization point computed by the correlation calculation by n samples as means for coping with the rear shift by the demodulation device 9 alone. When the shift means is provided, the synchronization point will shift forward by 0 to 2n samples even if it is shifted by ±0 to n samples by thinning out the correlation calculation, and thus can be prevented from interfering with the rear OFDM frame.

The PN sequence selection unit 33 is a part which selects a PN sequence yielding the highest correlation value in correlation values calculated by the PN sequence correlation calculation unit 32.

The symbol synchronization processing unit 34 is a part which identifies the point yielding the highest correlation value in the PN sequence selection unit 33 as a symbol synchronization point and performs a synchronization process in conformity with this symbol synchronization point.

The carrier selection unit 35 is a part which chooses a carrier frequency corresponding to the PN sequence selected by the PN sequence selection unit 33 and supplies thus chosen carrier frequency to the bandpass filter 36 and OFDM demodulation processing unit 38.

The bandpass filter 36 is a part which passes the reception acoustic signal through a bandpass filter based on the carrier frequency chosen by the carrier selection unit 35, so as to extract only the OFDM-modulated signal that is the transfer data signal.

The guard time elimination unit 37 is a part which eliminates the guard time from the OFDM-modulated signal that is the OFDM frame, so as to extract only the OFDM symbol.

The OFDM demodulation processing unit 38, which is a part for performing an OFDM demodulation processing, demodulates the OFDM-modulated signal by using the carrier frequency chosen by the carrier selection unit 35, so as to obtain the transfer data signal.

The P/S conversion unit 39 is a part which converts the parallel-bit-stream transfer data signal extracted by OFDM modulation into a single-bit-stream transfer data signal and outputs it.

The foregoing structure makes it possible to detect the carrier of the transfer data signal from the symbol synchronization signal included in the acoustic signal while performing the synchronization processing, and extract the transfer data signal.

Figure 7:
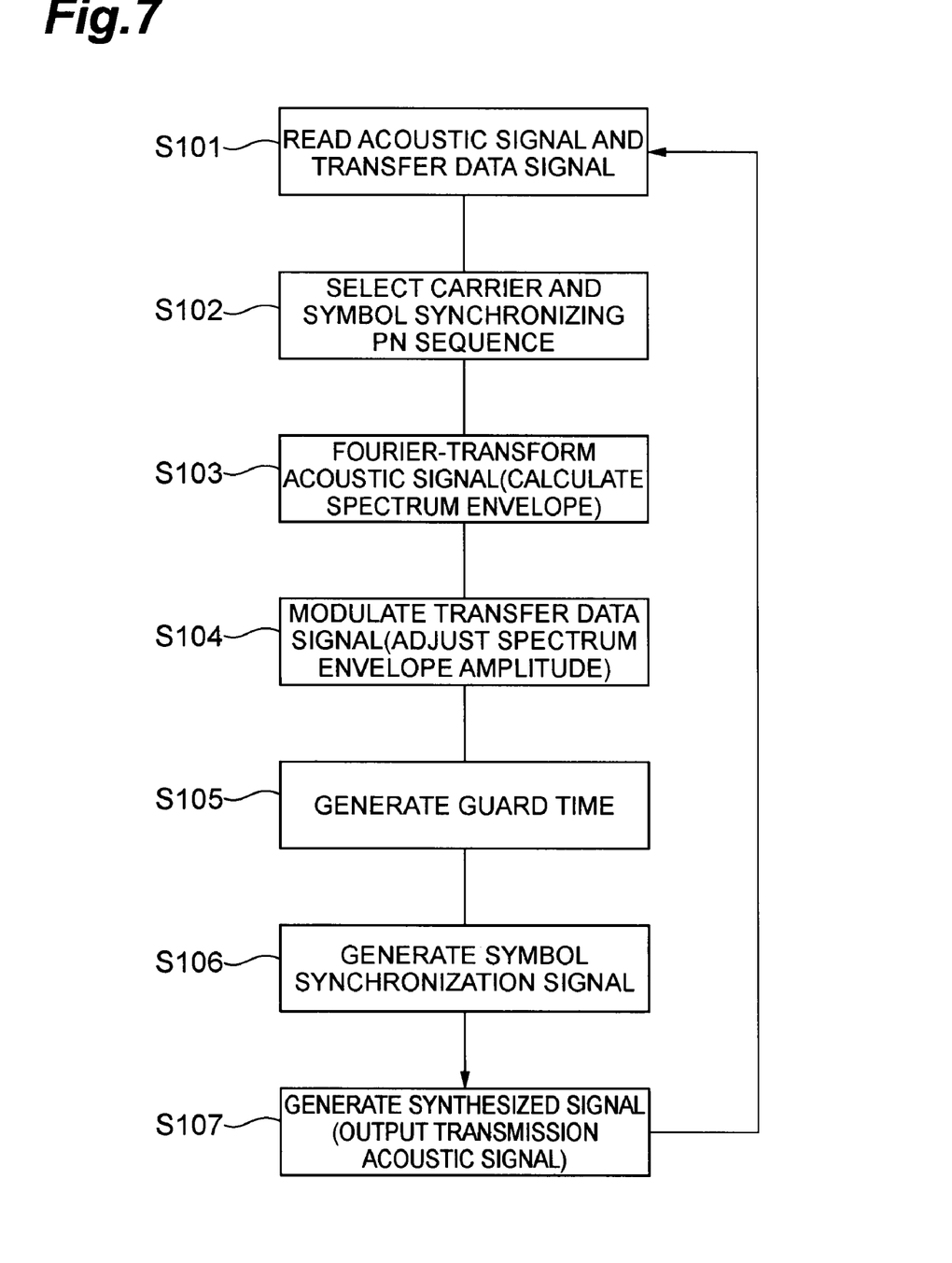
FIG. 7 is a flowchart illustrating operations of the modulation device 3 in this embodiment.

Operations of the modulation device 3 and demodulation device 9 in this embodiment will now be explained. FIG. 7 is a flowchart illustrating operations of the modulation device 3 of this embodiment.

In the modulation device 3, the acoustic signal 1 and transfer data signal 2 are read (S101). In the carrier selection unit 21 and PN sequence selection unit 26, a carrier frequency band of the transfer data signal and a PN sequence corresponding thereto are selected (S102). Subsequently, the spectrum envelope amplitude adjustment unit 24 subjects the acoustic signal 1 to Fourier transform, thereby calculating a frequency spectrum (S103). Thereafter, the bandpass filter 25 eliminates the frequency band of the OFDM-modulated signal from the acoustic signal 1, thereby generating the band-eliminated acoustic signal 11.

On the other hand, the transfer data signal 2 is converted into a parallel bit stream by the S/P conversion unit 20, the amplitude of a carrier is adjusted by the spectrum envelope amplitude adjustment unit 24 according to the envelope of the frequency spectrum calculated at S103, and thus adjusted individual carriers are modulated, so as to generate the OFDM-modulated signal (S104). Utilized as the carrier frequency is the frequency selected by the carrier selection unit 21. The guard time signal generation unit 23 generates front and rear guard times and adds them to an OFDM symbol of the OFDM-modulated signal (S105).

Next, the symbol synchronization signal generation unit 27 generates a symbol synchronization signal from the PN sequence chosen by the PN sequence selection unit 26 (S106). In the symbol synchronization signal generation unit 27, the amplitude of the symbol synchronization signal is adjusted according to the frequency masking threshold 13 in the low range of the acoustic signal 1. The generated OFDM-modulated signal, symbol synchronization signal, and band-eliminated acoustic signal 11 are combined together in the adder unit 29, and the resulting signal is converted into an analog signal by the D/A conversion unit 28, so as to be outputted as the transmission acoustic signal 4 (S107).

A specific example of the transmission acoustic signal including the OFDM-modulated signal transmitted from the modulation device 3 by such processing will now be explained. FIG. 5 illustrates an example in which the frequency band of the OFDM signal is variable. There are two kinds of OFDM-modulated signal band, i.e., the frequency band A (6.4 to 8.0 kHz) and frequency band B (4.0 to 5.6 kHz). When utilizing the frequency band A for the OFDM-modulated signal, a symbol synchronization signal is generated by using the PN sequence 1 (generator polynomial: x6+x+1) corresponding to the frequency band A. When utilizing the frequency band B for the OFDM-modulated signal, a symbol synchronization signal is generated by using the PN sequence 2 (generator polynomial: x6+x5+x2+x+1) corresponding to the frequency band B.

Figure 8:
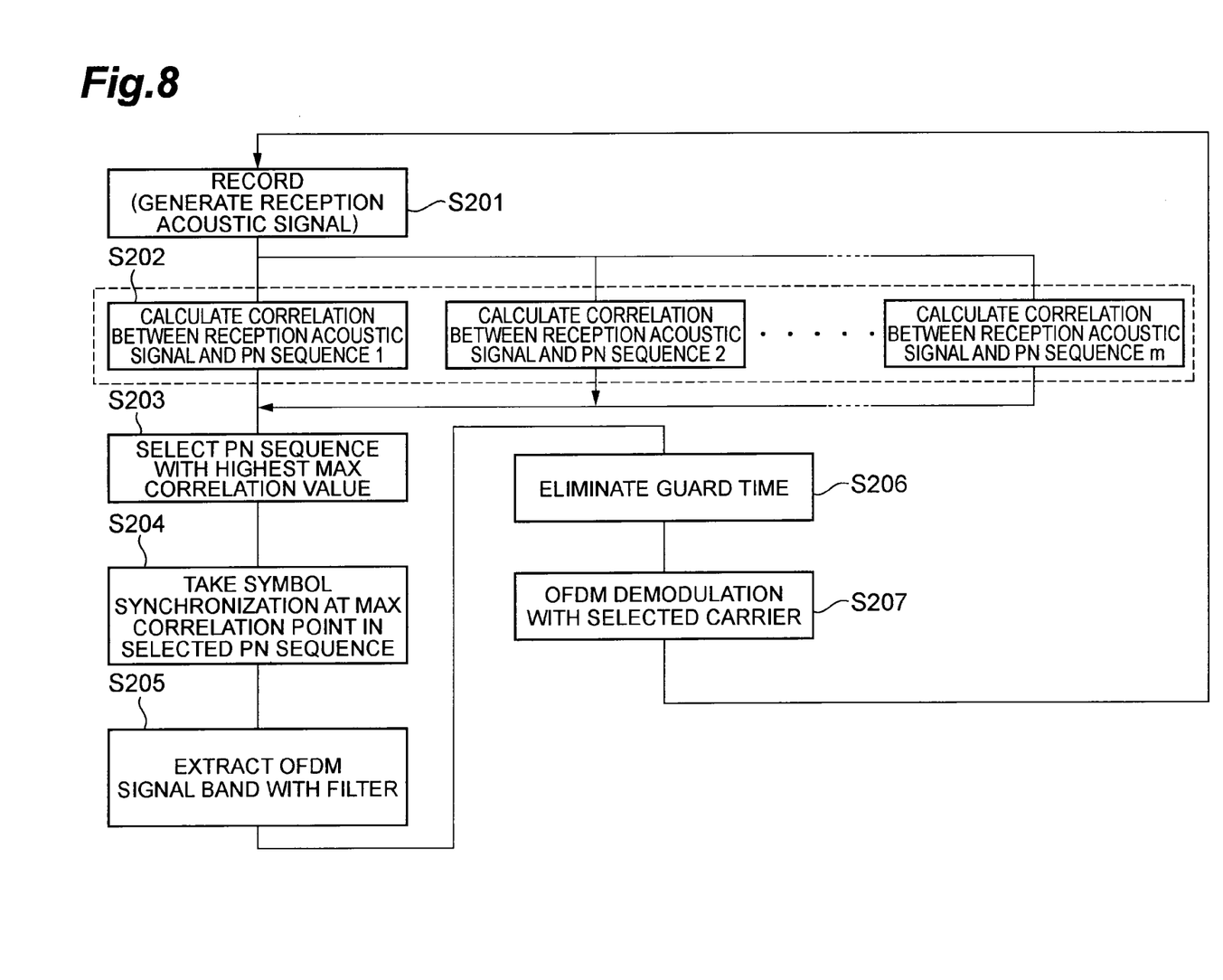
FIG. 8 is a flowchart illustrating operations of the modulation device 9 in this embodiment.

Operations of the demodulation device 9 will now be explained. FIG. 8 is a flowchart illustrating operations of the demodulation device 9 of this embodiment. The sound wave 6 is received by a microphone and recorded, so as to generate the reception acoustic signal 8 (S201). Subsequently, the reception acoustic signal 8 is converted into a digital signal by the A/D conversion unit 31, and correlation values with the PN sequence 1 (generator polynomial: x6+x+1) are calculated by the PN sequence correlation calculation unit 32 while shifting the reception acoustic signal 8 at intervals of one sample (S202).

When the frequency band of the OFDM-modulated signal is not variable, only the correlation with the PN sequence 1 is calculated, while omitting S203 in the PN sequence selection unit 33, so that the symbol synchronization is performed by the symbol synchronization processing unit 34 according to the reception signal point yielding the highest correlation value (S204). When the frequency band of the OFDM-modulated signal is variable, correlation values of the reception acoustic signal 8 with the PN sequence 1 (generator polynomial: x6+x+1), PN sequence 2 (generator polynomial: x6+x5+x2+x+1), . . . , PN sequence m are calculated while shifting the reception acoustic signal at intervals of one sample (S202). For reducing the processing, the calculation may be performed while shifting the signal at intervals of two or more samples.

Figure 9:
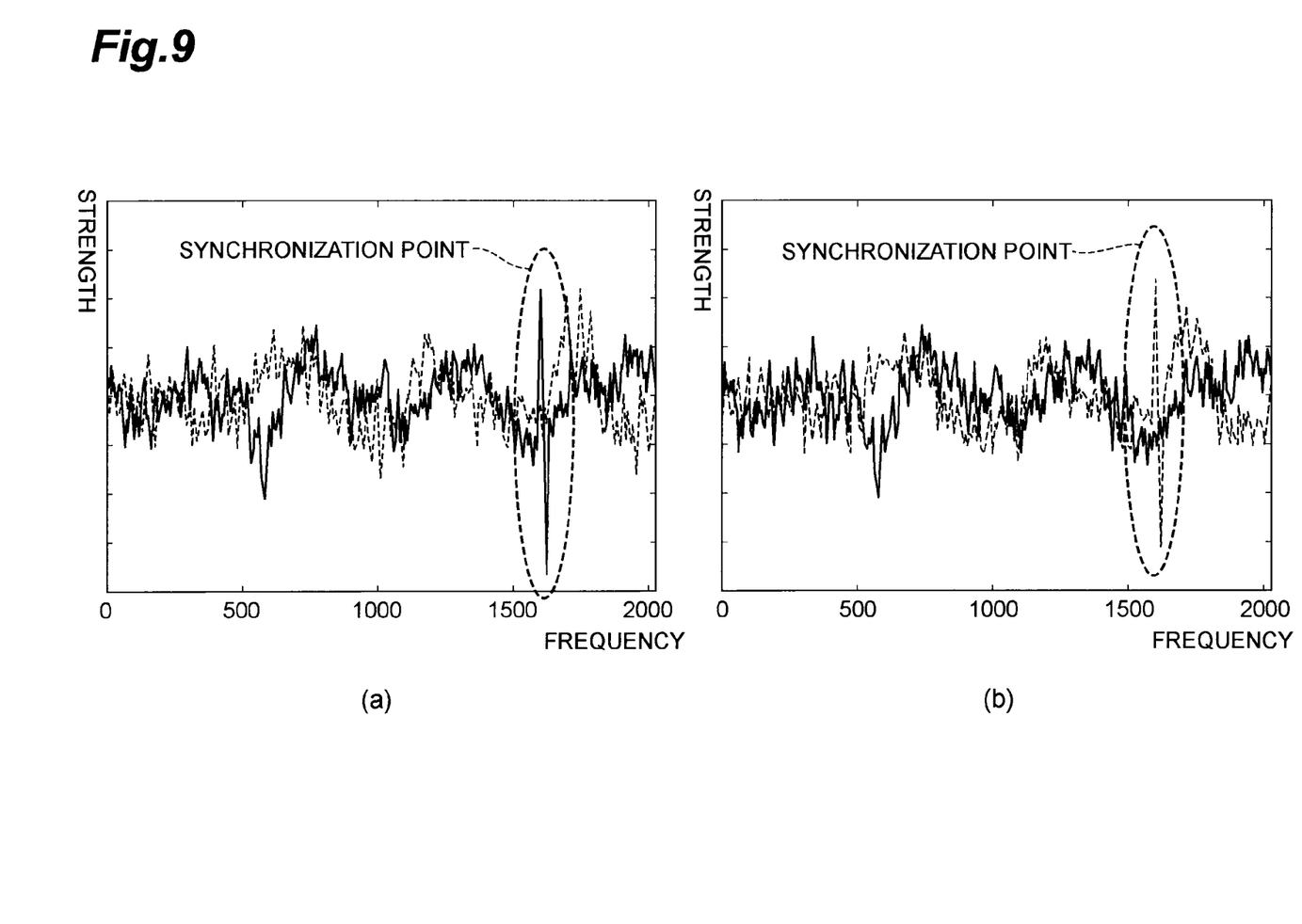
FIG. 9 is an explanatory chart illustrating peak correlation values when calculating correlations between a reception acoustic signal and PN sequences.

Next, the PN sequence selection unit 33 compares the maximum correlation value of the PN sequence 1, the maximum correlation value of the PN sequence 2, . . . , and the maximum correlation value of the PN sequence m with each other and selects the PN sequence having the highest correlation value (S203). FIG. 9 illustrates peak correlation values when calculating correlations of the reception acoustic signal and PN sequences. FIG. 9(a) illustrates a synchronization point used when calculating the correlation of the PN sequence 1 with the symbol synchronization signal, while FIG. 9(b) illustrates a synchronization point used when calculating the correlation of the PN sequence 2 with the symbol synchronization signal. As illustrated in FIGS. 9(a) and (b), it is seen that the correlation value is extremely higher at the synchronization point than in the remaining part, so that the synchronization should be taken at this point.

The symbol synchronization processing unit 34 performs a symbol synchronization process according to the reception acoustic signal point exhibiting the highest correlation value with the PN sequence selected by the PN sequence selection unit 33 (S204). In the bandpass filter 36, the frequency band of the OFDM signal corresponding to the selected PN sequence is extracted therethrough (S205). The guard time elimination unit 37 eliminates the guard time signals according to the symbol synchronization (S206), and demodulates the OFDM-modulated signal with the carrier corresponding to the selected PN sequence, so as to extract the transfer data signal (S207). This processing is repeated until there is no data.

Operational effects of the modulation device 3 and demodulation device 9 of this embodiment will now be explained. In the demodulation device 3, the carrier selection unit 21 selects a PN sequence for a symbol synchronization signal corresponding to the selected carrier frequency of the data signal, while the OFDM modulation processing unit 22 modulates the selected carrier frequency by using the data signal. The symbol synchronization signal generation unit 27 generates a symbol synchronization signal according to the PN sequence selected by the carrier selection unit 21. The adder unit 29 superposes the generated symbol synchronization signal and modulated data signal onto the acoustic signal, and outputs the resulting transmission acoustic signal to the speaker 5. The speaker 5 outputs it as a sound wave.

This can notify the demodulation device 9 side of the data signal carrier frequency by using the symbol synchronization signal without reserving any frequency for specifying the carrier frequency. Therefore, the carrier frequency for the data signal can be changed as appropriate, while making it possible to give notice of the data signal carrier frequency without using a carrier frequency for giving notice of the carrier frequency for carrying the data signal.

In the modulation device 3 of this embodiment, the OFDM modulation processing unit 22 performs a modulation processing and generates an OFDM symbol, the guard time signal generation unit 23 duplicates a predetermined part of the OFDM symbol generated by the OFDM modulation processing unit 22 and inserts thus generated guard time into the rear part of the data symbol, so as to generate an OFDM frame. Then, in the adder unit 29, the OFDM-modulated signal that is the OFDM frame and the symbol synchronization signal are superposed on the acoustic signal. This can prevent symbols from interfering with each other even if they are out of sync with each other.

In the demodulation device 9 of this embodiment, an acoustic signal superposed with the OFDM-modulated signal converted into the digital signal by the A/D conversion unit 31 is inputted. The PN sequence correlation calculation unit 32 calculates correlations between the inputted acoustic signal and a plurality of PN sequences 1 to m, while the PN sequence selection unit 33 determines the PN sequence having the highest maximum correlation value with the received acoustic signal in the plurality of PN sequences.

The symbol synchronization processing unit 34 identifies a synchronization point by using the PN sequence determined by the PN sequence selection unit 33 and, according to the synchronization point, performs a symbol synchronization process of the OFDM-modulated signal superposed on the acoustic signal. Subsequently, the bandpass filter 36 and guard time elimination unit 37 extract the OFDM-modulated signal that is the OFDM frame, thereby extracting the OFDM-modulated signal that is the OFDM symbol obtained by eliminating the guard time. Then, the OFDM demodulation processing unit 38 demodulates the OFDM-modulated signal. This can identify the carrier frequency for the data signal designated on the modulation device side without using any carrier frequency for giving notice of the carrier frequency for carrying the data signal.

In the demodulation device 9 of this embodiment, the PN sequence correlation calculation unit 32 calculates the correlation between the received reception acoustic signal and the PN sequence in a thinning-out manner at intervals of at least two samples. Then, according to the number of samples thinned out in the correlation calculation, the symbol synchronization processing unit 34 forwardly shifts the synchronization point of the data symbol derived from the correlation calculation. This can lower the amount of arithmetic operations for the correlation calculation and reduce the interference between symbols even when a synchronization deviation occurs.

The invention claimed is:

1. An acoustic signal transmission method comprising:
    selecting, by a selection unit of a modulation device, a carrier frequency of a data signal and a PN sequence corresponding to the carrier frequency;
    modulating, by a modulation unit of the modulation device, the carrier frequency selected by the selecting with the data signal;
    generating, by a generation unit of the modulation device, a symbol synchronization signal according to the PN sequence selected by the selecting;
    superposing, by a superimposition unit of the modulation device, the symbol synchronization signal generated by the generating and the data signal modulated by the modulating onto the acoustic signal and transmitting thus obtained signal;
    receiving, by an input unit of a demodulation device, the acoustic signal superposed with the modulated data signal;
    calculating, by a calculation unit of the demodulation device, correlations between the acoustic signal received by the receiving and a plurality of PN sequences;
    determining, by a determination unit of the demodulation device, the PN sequence having the highest maximum correlation value with the received acoustic signal in the plurality of PN sequences according to a result of the calculating;
    deciding, by a synchronization processing unit of the demodulation device, a synchronization point by using the PN sequence determined by the determining and synchronizing the modulated data signal superposed on the acoustic signal according to the synchronization point; and
    demodulating, by a demodulation unit of the demodulation device, the modulated data signal subjected to the synchronizing.

2. A modulation device for superposing a data signal on an acoustic signal and transmitting thus obtained signal, the modulation device comprising:
    a selection unit that selects a carrier frequency of the data signal and a PN sequence corresponding to the carrier frequency;
    a modulation unit that modulates the carrier frequency selected by the selection unit with the data signal;
    a generation unit that generates a symbol synchronization signal according to the PN sequence selected by the selection unit; and
    a superposition unit that superimposes the symbol synchronization signal generated by the generation unit and the data signal modulated by the modulation unit onto the acoustic signal.

3. A modulation device according to claim 2, further comprising:
    an insertion unit that inserts at a rear part of a data symbol of the modulated data signal a guard time block generated by duplicating a predetermined part in front of the data symbol, wherein
    the modulated data signal inserted with the guard time block by the insertion unit and the symbol synchronization signal are superposed on the acoustic signal.

4. A demodulation device comprising:
    an input unit that receives an acoustic signal superposed with a modulated data signal;
    a calculation unit that calculates correlations between the acoustic signal received by the input unit and a plurality of PN sequences;
    a determination unit that determines the PN sequence having the highest maximum correlation value with the received acoustic signal in the plurality of PN sequences according to a result of calculation by the calculation unit;
    a synchronization processing unit that decides a synchronization point by using the PN sequence determined by the determination unit and synchronizes the modulated data signal superposed on the acoustic signal according to the synchronization point; and
    a demodulation unit that demodulates the modulated data signal subjected to the synchronizing by the synchronization processing unit.

5. A demodulation device according to claim 4, wherein
    the calculation unit calculates correlations between the received acoustic signal and PN sequences in a thinning-out manner at intervals of at least two samples, and
    the demodulation device further comprises a shift unit that forwardly shifts according to the number of thinned-out samples in the correlation calculation by the calculation unit the synchronization point of a data symbol derived from the correlation calculation by the calculation unit.

6. An acoustic signal transmission system comprising:
    a modulation device for superposing a data signal on an acoustic signal and transmitting thus obtained signal, the modulation device comprising
        a selection unit that selects a carrier frequency of the data signal and a PN sequence corresponding to the carrier frequency;
        a modulation unit that modulates the carrier frequency selected by the selection unit with the data signal;

a generation unit that generates a symbol synchronization signal according to the PN sequence selected by the selection unit; and a superposition unit that superimposes the symbol synchronization signal generated by the generation unit and the data signal modulated by the modulation unit onto the acoustic signal; and a demodulation device comprising:

an input unit that receives the acoustic signal superposed with the modulated data signal;

a calculation unit that calculates correlations between the acoustic signal received by the input unit and a plurality of PN sequences;

a determination unit that determines the PN sequence having the highest maximum correlation value with the received acoustic signal in the plurality of PN sequences according to a result of calculation by the calculation unit;

a synchronization processing unit that decides a synchronization point by using the PN sequence determined by the determination unit and synchronizes the modulated data signal superposed on the acoustic signal according to the synchronization point; and a demodulation unit that demodulates the modulated data signal subjected to the synchronizing by the synchronization processing unit.

* * * * *